United States Patent
Holmes

(10) Patent No.: US 7,373,614 B1
(45) Date of Patent: May 13, 2008

(54) NAVIGATION HISTORY

(75) Inventor: Tim Holmes, San Leandro, CA (US)

(73) Assignee: Apple Inc., Cupertino, CA (US)

( * ) Notice: Subject to any disclaimer, the term of this patent is extended or adjusted under 35 U.S.C. 154(b) by 748 days.

(21) Appl. No.: 10/775,941

(22) Filed: Feb. 10, 2004

(51) Int. Cl.
*G06F 3/00* (2006.01)

(52) U.S. Cl. ............... 715/855; 715/853; 715/854; 702/187

(58) Field of Classification Search ............ 715/855, 715/853, 854; 702/187
See application file for complete search history.

(56) References Cited

U.S. PATENT DOCUMENTS

| | | | |
|---|---|---|---|
| 5,581,681 A | 12/1996 | Tchao et al. | |
| 5,590,256 A | 12/1996 | Tchao et al. | |
| 5,874,953 A * | 2/1999 | Webster et al. | 715/733 |
| 6,061,062 A | 5/2000 | Venolia | 345/341 |
| 2004/0003351 A1* | 1/2004 | Sommerer et al. | 715/517 |
| 2004/0169677 A1* | 9/2004 | Utsuki et al. | 345/734 |
| 2004/0243938 A1* | 12/2004 | Weise et al. | 715/526 |
| 2005/0086613 A1* | 4/2005 | McKnight et al. | 715/855 |
| 2005/0132297 A1* | 6/2005 | Milic-Frayling et al. | 715/745 |

\* cited by examiner

*Primary Examiner*—Kieu D. Vu
*Assistant Examiner*—Dennis G. Bonshock
(74) *Attorney, Agent, or Firm*—Schwegman, Lundberg & Woessner P.A.

(57) ABSTRACT

A method, apparatus, system, and signal-bearing medium that in an embodiment represent previously-accessed data items as nodes in a tree or trees and display the tree or trees with the access time on an axis. The root node of a tree represents a data item accessed via an address entered by a user while a child node of the tree represents a data item selected from a parent node of the child node. In an embodiment, data items that were displayed in the same window as their parents have different connectors between their associated nodes than do data items that were displayed in different windows from their parents.

17 Claims, 5 Drawing Sheets

NAVIGATION HISTORY

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to navigation among data items and more particular to navigation among data items using a tree history.

BACKGROUND

The World Wide Web, which is a collection of interconnected and cross-linked web pages located on computers, has become an important source of information. Users employ applications known as browsers to access these web pages. Since users frequently access the same web pages repeatedly, especially web pages that they have recently used, most browsers keep track of the web pages that the user has previously accessed using a technique known as a history. Previous browsers have used a linear history in chronological order that the user could navigate through using forward and back buttons, which are analogous to the rewind and fast-forward buttons on a VCR (video cassette recorder).

For example, a user might first visit the home page of a favorite baseball team and then follow a link on that home page to a second page with a particular player's batting average, and then follow another link on the second page to a third page containing an magazine article about the player. Subsequently, the user selects the back button on the browser twice to return to the home page of the baseball team instead of needing to type in the address of the home page.

A problem with this linear history is that users can visit a large number of web pages, which are confusing to view in a linear history, and the forward and back buttons are inefficient and cumbersome way to navigate through multiple web pages. Further, the problems of a linear history are not confined to pages accessed via a web browser, but also apply when a succession of data of other types is accessed over a period of time.

SUMMARY

A method, apparatus, system, and signal-bearing medium are provided that in an embodiment represent previously-accessed data items as nodes in a tree or trees and display the tree or trees with the access time on an axis. The root node of a tree represents a data item accessed via an address entered by a user, while a child node of the tree represents a data item selected from a parent node of the child node. In an embodiment, data items that were displayed in the same window as their parents have different connectors between their associated nodes than do data items that were displayed in different windows from their parents.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The following detailed description is, therefore, not to be taken in a limiting sense, and the scope of the present invention is defined only by the appended claims.

In the following description, numerous specific details are set forth to provide a thorough understanding of the invention. It is understood, however, that the invention may be practiced without these specific details. In other instances, well-known circuits, structures, and techniques have not been shown in detail in order not to obscure the invention.

Figure 1:
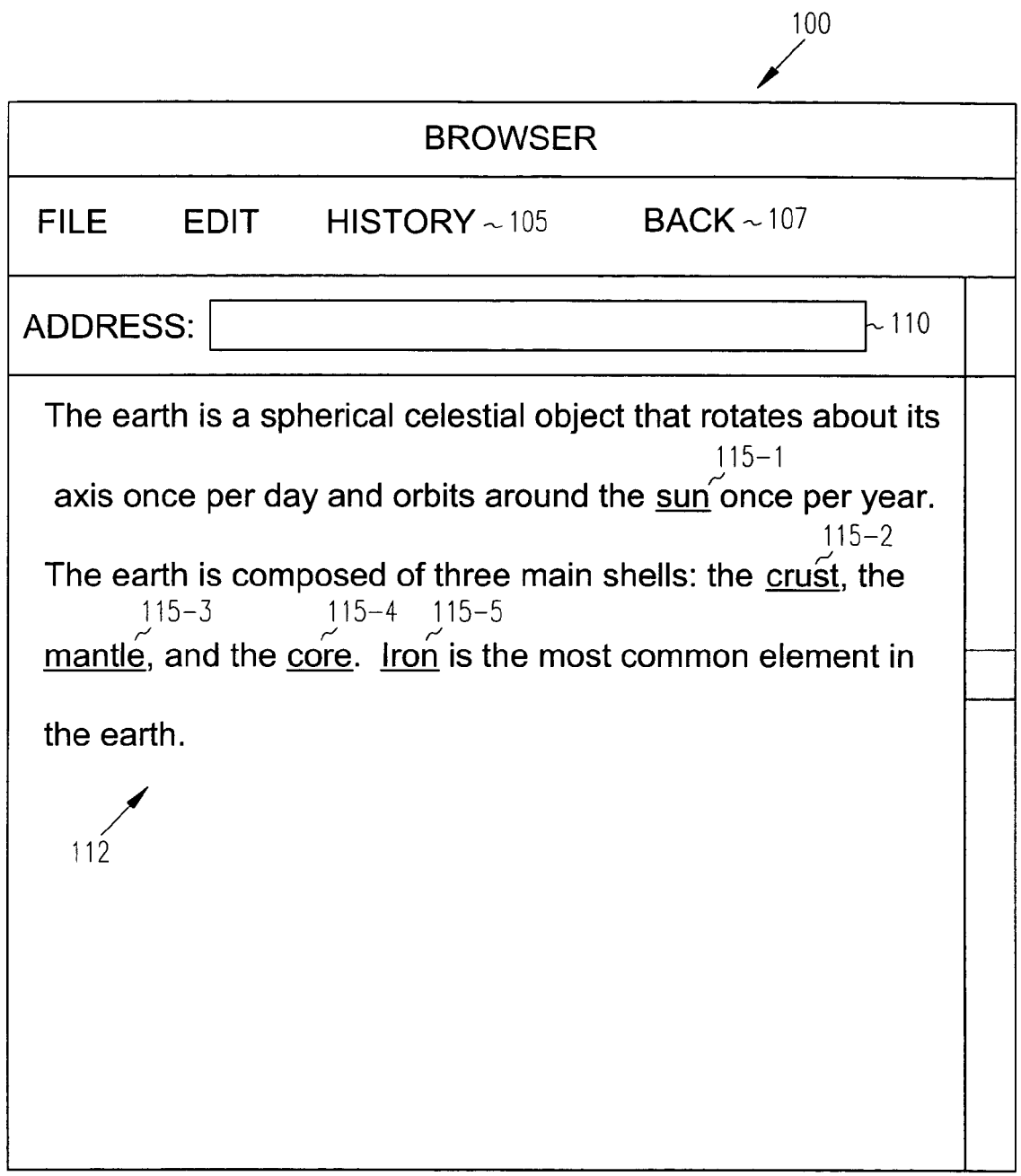
FIG. 1 depicts a pictorial representation of an example user interface illustrating a browser window, according to an embodiment of the invention.

FIG. 1 depicts a pictorial representation of an example user interface illustrating a browser window 100, according to an embodiment of the invention. The browser window 100 includes a history button 105, a back button 107, an address field 110, page contents 112, and links 115-1, 115-2, 115-3, 115-4, and 115-5 within the page contents 112. When a user selects the history button 105, the browser displays at least one tree view of the history of pages accessed, as further described below with reference to FIG. 2. In some other embodiments, to display the at least one tree view of the history of pages accessed a user presses one or more keys simultaneously. In yet other embodiments, a user opens the tree view using a voice command or the tree view is caused to open by an application programming interface (API) call from another application, system, macro, or other similar computing routine or program.

When the user selects the back button 107, the browser retrieves and displays a previously-accessed page, which is a data item, and also displays the address of the page in the address field 110. When the user selects one of the links 115-1, 115-2, 115-3, 115-4, or 115-5, the browser retrieves another page associated with the selected link and displays the address of the accessed page in the address field 110. This other page may be displayed in the page contents 112 or displayed in another window associated with another browser instance. Whether a page is displayed in the same window or a different window may be specified by the user, by the browser, by the accessed page, or in some other suitable manner.

The address field 110 also allows the user to enter an address of a page, which the browser retrieves and displays. In an embodiment, the address is a URL (Uniform Resource Locator), but in other embodiments any appropriate address may be used. Thus, the back button 107, the address field 110, and the links 115-1, 115-2, 115-3, 115-4, and 115-5 are alternative ways for the user to request that the browser access and display a page.

The links may be selected via a mouse or other pointing device, a voice command, or any other appropriate technique. Although five links 115-1, 115-2, 115-3, 115-4, and 115-5 are shown, any number may be present. Although the links are shown to be identified by underlining, in other embodiments the links may be identified by color, blinking, highlighting, reverse video, animation, or any other appropriate technique.

Although an embodiment is described in the context of a browser, other embodiments may operate in the context of a database query system in which multiple database records may be queried, a file system in which multiple files may be accessed, or any other system in which multiple data items are accessed or are accessible.

Figure 2:
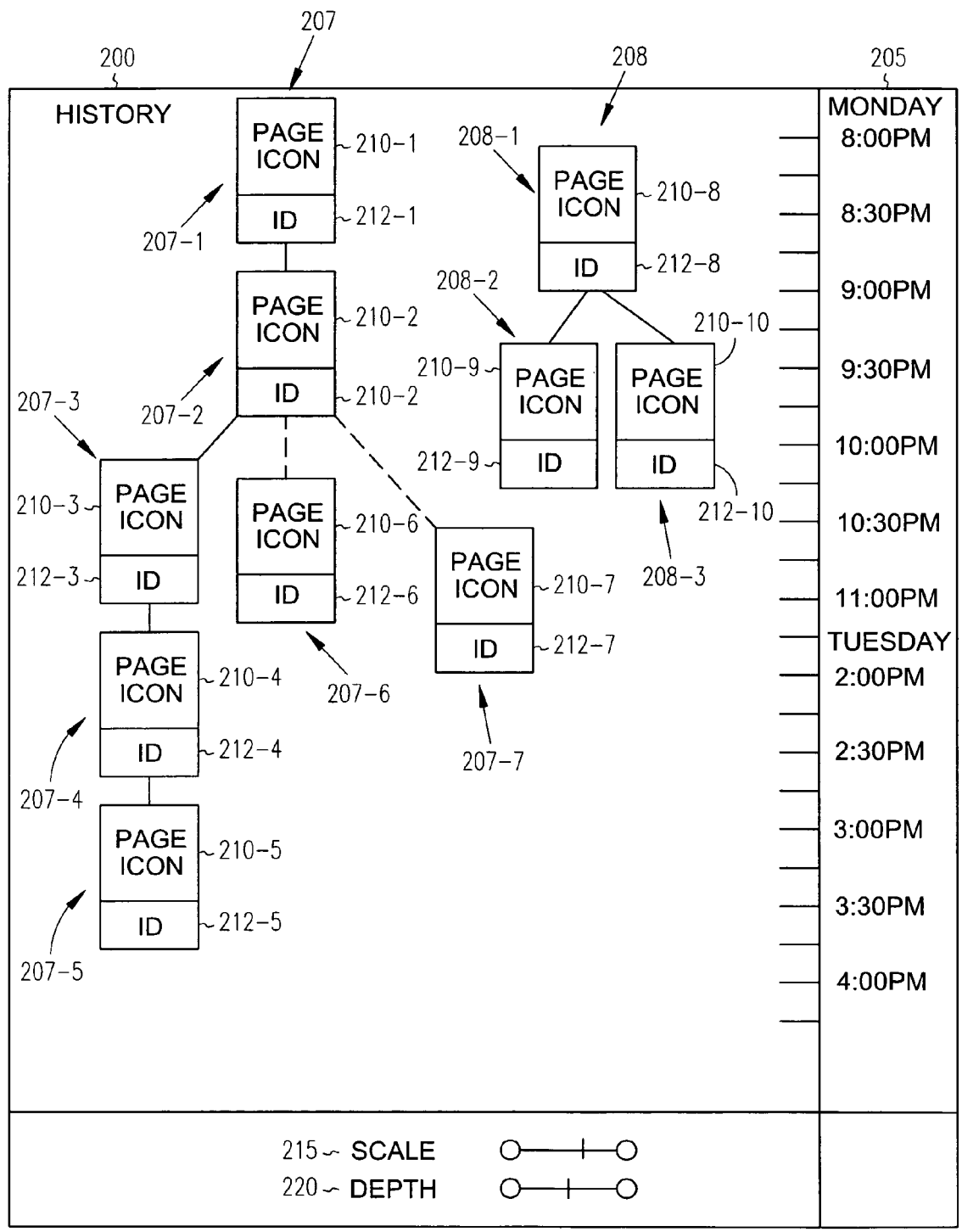
FIG. 2 depicts a pictorial representation of an example user interface illustrating a history window, according to an embodiment of the invention.

FIG. 2 depicts a pictorial representation of an example user interface illustrating a history window 200, according to an embodiment of the invention. The history window 200 includes, in this example, two trees 207 and 208, each of which includes multiple nodes. In other embodiments, the history window 200 may include only one tree or more than two trees.

A tree is a graphical format for displaying on an output device the hierarchical organization of nodes. The nodes can represent other objects, such as web pages, database records, files, or other data items. A tree takes its name from an analogy to trees in nature, which have a hierarchical organization of branches and leaves. For example, a leaf belongs to a small branch, which further belongs to a large branch, and all branches of the tree have a common starting point at the root.

In some embodiments, a tree can be defined as a finite set, T, of one or more nodes, such that:
a) there is one specially designated node called the root of the tree; and
b) the remaining nodes (excluding the root) are partitioned into m>=0 disjoint sets T1, . . . Tm, and each of these sets is in turn a tree. The trees T1, . . . , Tm are called the subtrees of the root.

Thus, in such embodiments, every node in a tree is the root of some subtree contained in the entire tree. The number of subtrees of a node is called the degree of that node. A node of degree zero is called a terminal node or a leaf. A nonterminal node is called a branch node. The level of a node with respect to T is defined by saying that the root has level 0, and other nodes have a level that is one higher than they have with respect the subtree that contains them. Each root is the parent of the roots of its subtrees, and the latter are siblings, and they are also the children of their parent. The root of the entire tree has no parent.

The first entire tree 207 in the history window 200 includes nodes 207-1, 207-2, 207-3, 207-4, 207-5, 207-6, and 207-7, where node 207-1 is the root node for the entire tree 207 since node 207-1 has no parent. Node 207-1 is the parent of node 207-2, which is the child of node 207-1. Node 207-2 is also the parent of nodes 207-3, 207-6, and 207-7, which are siblings and are also the children of node 207-2. Node 207-3 is the parent of node 207-4, which is the child of node 207-3. Node 207-4 is the parent of node 207-5, which is the child of node 207-4. Nodes 207-5, 207-6, and 207-7 have no children, so they are terminal nodes.

The second entire tree 208 in the history window 200 includes nodes 208-1, 208-2, and 208-3 where node 208-1 is the root node for the entire tree 208 since node 208-1 has no parent. Node 208-1 is the parent of nodes 208-2 and 208-3, which are siblings and the children of node 208-1. Nodes 208-2 and 208-3 have no children, so they are terminal nodes.

The root nodes 207-1 and 208-1 of the entire respective trees 207 and 208 represent data items (in this example a page) accessed via an address entered by a user (for example an address entered in the address field 110 in FIG. 1). In contrast, the child nodes (207-2, 207-3, 207-4, 207-5, 207-6, 207-7, 208-2, and 208-3) of the entire respective trees 207 and 208 represent data items selected from data items associated with the parent nodes of the child nodes (for example selected via one of the links 115-1, 115-2, 115-3, 115-4, or 115-5 in FIG. 1).

In an embodiment, the data items that were displayed in the same window as their parents have connectors between their associated nodes that have a first format while data items that were displayed in different windows from their parents have connectors with a second format. In the example shown, the connector between nodes 207-2 and 207-3 is a solid line (first format) while the connector between nodes 207-2 and 207-6 is a dashed line (second format), and the connector between nodes 207-2 and 207-7 is a dashed line (second format). In the embodiment shown, a solid line indicates the data item associated with the child node (e.g. node 207-3) was displayed in the same window as the data item associated with the parent node (e.g. node 207-2). In the embodiment shown, a dashed line indicates the data item associated with the child node (e.g. node 207-6) was displayed in a different window as the data item associated with the parent node (e.g. node 207-2). But in other embodiments, any appropriate format (solid line, dashed line, dotted line, or any other format) may be used for connectors between nodes, and the first and second formats may be the same or different.

The nodes include a page icon and an identifier, but in other embodiments either the page icon or the identifier may not be present. The page icon represents the associated data item in symbolic form. In an embodiment, the page icon is an iconized view of an image associated with the data item, for example a page. In an embodiment, only a portion of the page is used in the page icon, and the portion of the page may be selected to be easily recognizable. In an embodiment, the identifier is a name of the data item. In another embodiment, the identifier is an address of the data item. In another embodiment, the identifier is a truncated address of the data item. Nodes 207-1, 207-2, 207-3, 207-4, 207-5, 207-6, 207-7, 208-1, 208-2, and 208-3 include page icons 210-1, 210-2, 210-3, 210-4, 210-5, 210-6, 210-7, 210-8, 210-9, and 210-10, respectively and identifiers 212-1, 212-2, 212-3, 212-4, 212-5, 212-6, 212-7, 212-8, 212-9, 212-10, respectively.

The window 200 also includes a time axis 205, which identifies the time that the data items associated with the nodes were accessed. In the embodiment shown, the time axis 205 includes the day of the week along with hours and minutes. In another embodiment, the time axis 205 may include the day, month, and year or any combination of the day, month, and year. In the embodiment shown, only times relevant to the access times of the nodes are displayed in the time axis 205. For example, no data items were accessed between 11:00 pm on Monday and 2:00 pm on Tuesday, so times between these access times are not displayed. In another embodiment, all times are displayed.

In the example shown, the trees 207 and 208 are displayed vertically with their respective root nodes on top (the opposite of trees in nature), so that the most recent data item accessed is identified by a terminal node at the bottom (node 207-5 in the example shown). In another embodiment, trees may be displayed vertically with their roots on the bottom (the same as trees in nature), so that the most recent data item accessed is identified by a terminal node at the top. In still other embodiments, a tree may be displayed horizontally with its root on either the right or the left.

The scale 215 is a slider that allows the user to request that the size of all the nodes or only selected nodes be increased or decreased. In another embodiment, any appropriate user interface element may be used for the scale 215 in lieu of a slider.

The depth 220 is a slider that allows the user to request that the nodes be compressed or expanded. In another embodiment, any appropriate user interface element may be used for the depth 220 in lieu of a slider. In an embodiment, the depth 220 affects all nodes. In another embodiment, the depth 220 affects only selected nodes. Compression takes advantage of the hierarchical nature of web pages, which is reflected in the addresses of the web pages, to reduce the number of nodes displayed in a tree. The hierarchical nature of addresses can be understood by the following example. Consider the URL address, "http://www.uspto.gov/web/menu/intro.html," which is an address to an introduction about the United States Patent and Trademark Office. This URL specifies a hypertext transfer-protocol ("http") and a name ("www.uspto.gov") of the server (the first hierarchical level). The URL also specifies the name of the file that contains the text ("intro.html") (the 4th hierarchical level) and the hierarchical directory ("web") (the 2nd hierarchical level) and subdirectory ("menu") (the 3rd hierarchical level) structure in which the file resides on the server. A directory is a grouping of files on the server that usually contain related information. A subdirectory is a division within a directory. A URL might contain any number of directories and subdirectories. The delimiter that separates the various identifier-components (the different hierarchical levels) of the URL is a "/" in this example.

A user might access many pages within the www.uspto.gov web site, which clutters the tree view. Compression reduces the number of displayed nodes by only displaying, for example, nodes associated with pages that have an address with a hierarchical level corresponding to the position of the depth slider. When the depth 220 is set at zero compression, all nodes are displayed. When the depth 220 is set at maximum compression, only nodes associated with an address at the first hierarchical level are displayed. When the depth 220 is set at a compression between zero and the maximum, nodes are displayed based on their hierarchical level relative to the setting of the depth 220. The hierarchical level of an address is determined by counting the number of delimiters in the address. Expansion is a reverse operation from compression.

A user may request that nodes be deleted from the trees 207 and 208 via a keyboard, mouse or other pointing device, or any other appropriate user interface.

Figure 3:
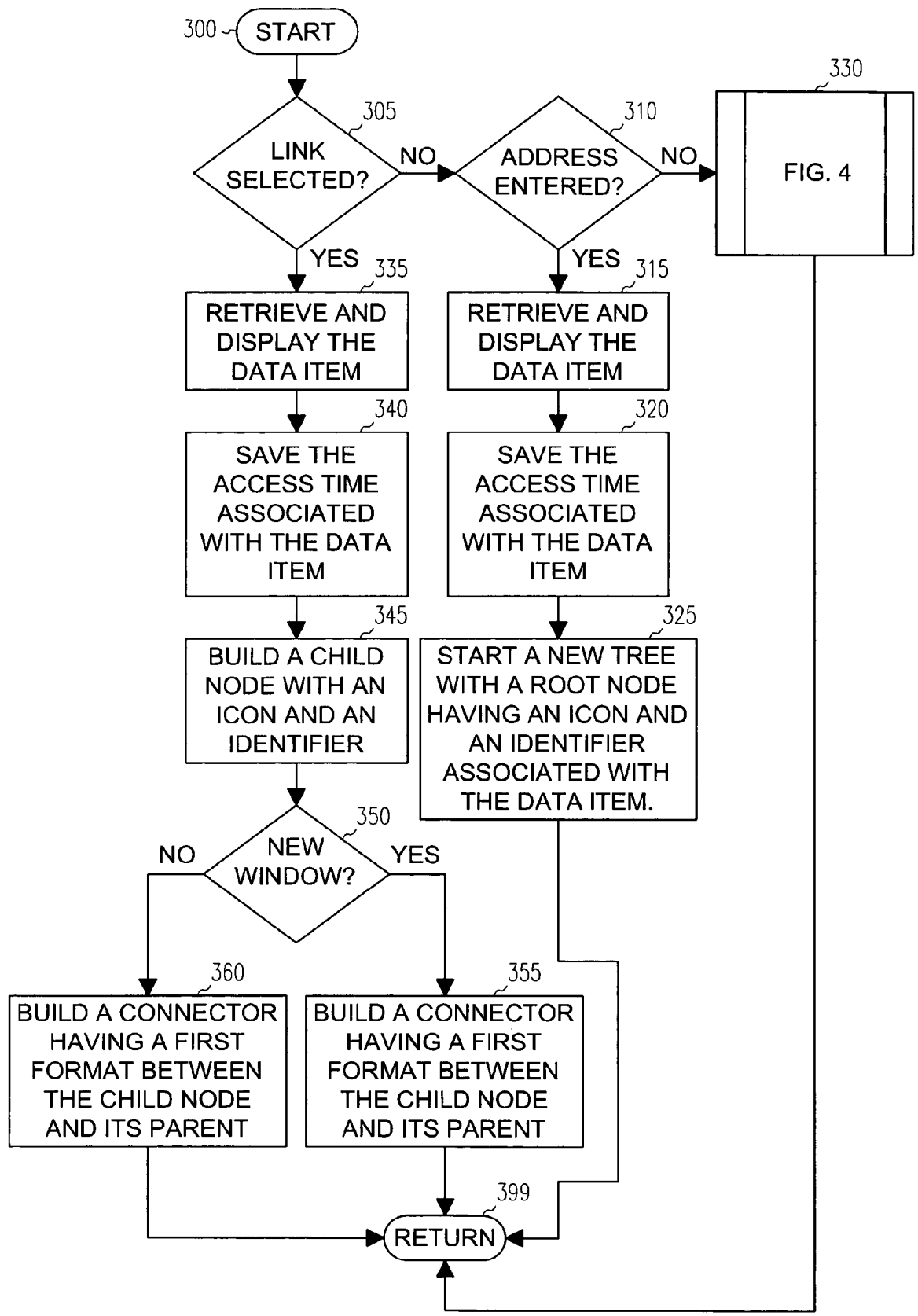
FIG. 3 depicts a flowchart of example processing, according to an embodiment of the invention.

FIG. 3 depicts a flowchart of example processing, according to an embodiment of the invention. Control begins at block 300. Control then continues to block 305 where a determination is made whether a link (e.g., one of the links 115-1, 115-2, 115-3, 115-4, or 115-5 in FIG. 1) is selected in a data item. If the determination at block 305 is false, then control continues to block 310 where a determination is made whether an address was entered (e.g., via the address field 110 in FIG. 1). If the determination at block 310 is true, then control continues to block 315 where the data item identified by the address previously entered at block 310 is retrieved and displayed. Control then continues to block 320 where the access time associated with the displayed data item is saved. Control then continues to block 325 where a new tree is started with a root node having an icon and/or an identifier associated with the data item. Control then continues to block 399 where the function returns.

Figure 4:
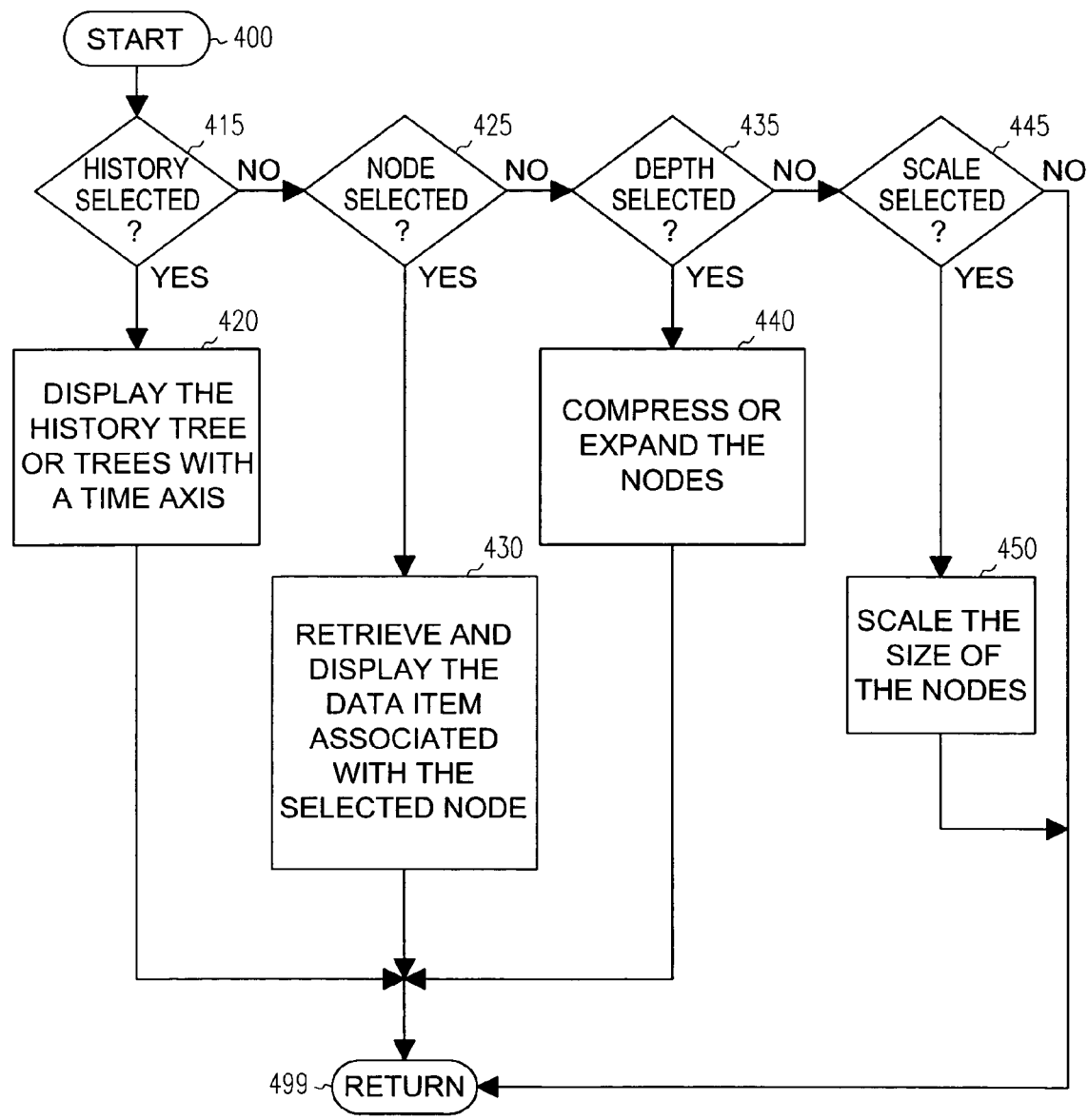
FIG. 4 depicts a flowchart of example processing, according to an embodiment of the invention.

If the determination at block 310 is false, then control continues to block 330 where the function of FIG. 4 is called. Control then continues to block 399 where the function returns.

If the determination at block 305 is true, then control continues to block 335 where the data item identified by the selected link is retrieved and displayed. Control then continues to block 340 where the time that the data item was accessed (retrieved and displayed) is saved. Control then continues to block 345 where a child node is built with an icon and/or an identifier. The child node is built in a previously-existing tree associated with the parent of the accessed data item.

Control then continues to block 350 where a determination is made whether the data item was displayed in a window different from the window in which the parent data item was displayed. The parent data item is the data item from which the link was previously selected at block 305. Referring again to block 350, if the determination at block 350 is false, then control continues to block 360 where a connector having a first format is built between the child node created at block 345 and the parent node associated with the data item from which the link was selected at block 305. In an embodiment the first format may be a solid line. In yet another format, the first format may be any appropriate type of connector format. Control then continues to block 399 where the function returns.

If the determination at block 350 is true, then control continues to block 355 where a connector having a second format is built between the child node created at block 345 and the parent node associated with the data item from which the link was selected at block 305. In an embodiment the second format is different from the first format. In another embodiment, the second format is the same as the first format. In an embodiment the second format may be a dashed line. In another embodiment the second format may be a dotted line. In yet another format, the second format may be any appropriate type of connector format. Control then continues to block 399 where the function returns.

FIG. 4 depicts a flowchart of example processing, according to an embodiment of the invention. Control begins at block 400. Control then continues to block 415 where a determination is made whether a display of the history has been selected. In an embodiment, the display of the history may be selected via the history button 105 (FIG. 1). If the determination at block 415 is true, then control continues to block 420 where the history tree or trees are displayed with a time axis, an example of which was previously described above with reference to FIG. 2. Control then continues to block 499 where the function returns.

If the determination at block 415 is false, then control continues to block 425 where a determination is made whether a node in the history tree has been selected. If the determination at block 425 is true, then control continues to block 430 where the data item associated with the node selected at block 425 is retrieved and displayed. Control then continues to block 499 where the function returns.

If the determination at block 425 is false, then control continues to block 435 where a determination is made whether a request to change the depth has been made. In an embodiment, a change to the depth may be requested via the depth 220 (FIG. 2). If the determination at block 435 is true, then control continues to block 440 where the nodes are compressed or expanded based on the depth 220. Control then continues to block 499 where the function returns.

If the determination at block 435 is false, then control continues to block 445 where a determination is made whether a change in the scale has been requested. A request to change the scale may be made via the scale 215 (FIG. 2). If the determination at block 445 is true, then control continues to block 450 where the size of the nodes are scaled. Control then continues to block 499 where the function returns.

If the determination at block 445 is false, then control continues to block 499 where the function returns.

Figure 5:
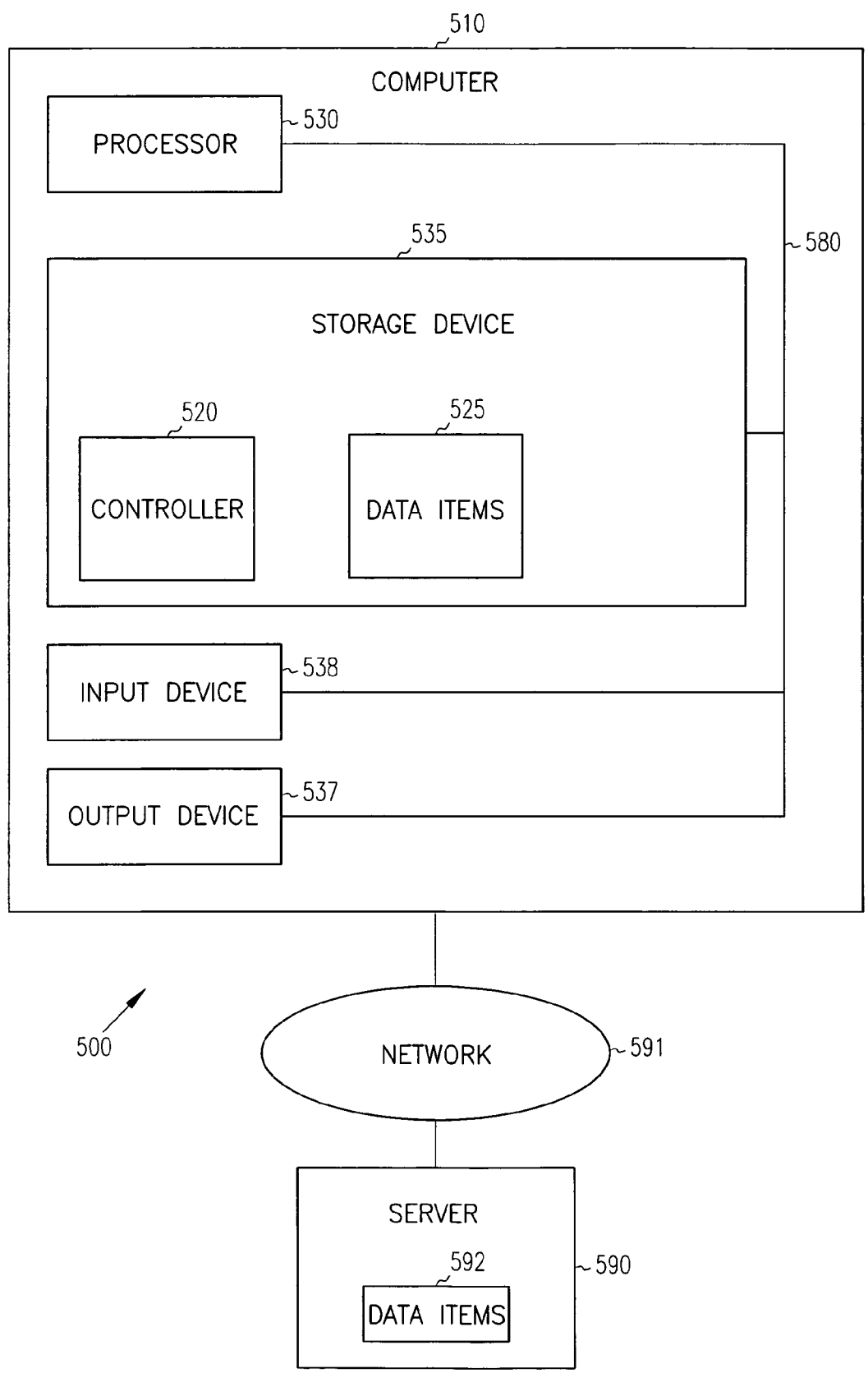
FIG. 5 depicts a block diagram of an example system for implementing an embodiment of the invention.

FIG. 5 depicts a block diagram of an example system for implementing an embodiment of the invention. A system 500 includes a computer 510 connected to a server 590 via a network 591. Although one computer 510, one server 590, and one network 591 are shown, in other embodiments any number or combination of them are present. In another embodiment, the server 590 and the network 591 are not present.

The computer 510 includes a processor 530, a storage device 535, an output device 537, and an input device 538, all connected via a bus 580. The processor 530 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 530 executes instructions and includes that portion of the computer 510 that controls the operation of the entire computer. Although not depicted in FIG. 5, the processor 530 typically includes a control unit that organizes data and program storage in memory and transfers data and other information between the various parts of the computer 510. The processor 530 receives input data from the input device 538 and the network 591, reads and stores code and data in the storage device 535, and presents data to the output device 537.

Although the computer 510 is shown to contain only a single processor 530 and a single bus 580, the present invention applies equally to computers that may have multiple processors and to computers that may have multiple buses with some or all performing different functions in different ways.

The storage device 535 represents one or more mechanisms for storing data. For example, the storage device 535 may include read only memory (ROM), random access memory (RAM), magnetic disk storage media, optical storage media, flash memory devices, and/or other machine-readable media. In other embodiments, any appropriate type of storage device may be used. Although only one storage device 535 is shown, multiple storage devices and multiple types of storage devices may be present. Further, although the computer 510 is drawn to contain the storage device 535, it may be distributed across other computers, for example on server 590.

The storage device 535 includes a controller 520 and data items 525. The controller 520 includes instructions capable of being executed on the processor 530 to carry out the functions of the present invention, as previously described above with reference to FIGS. 1, 2, 3, and 4. In another embodiment, some or all of the functions of the present invention are carried out via hardware in lieu of a processor-based system. In an embodiment, the controller 520 is a browser, but in other embodiments, the controller 520 may be a database system, a file system, or may include any other functions capable of accessing data items. Of course, the storage device 535 may also contain additional software and data (not shown), which is not necessary to understanding the invention.

Although the controller 520 and the data items 525 are shown to be within the storage device 535 in the computer 510, some or all of them may be distributed across other systems, for example on the server 590 (e.g., data items 592) and accessed via the network 591.

The output device 537 is that part of the computer 510 that displays output to the user. The output device 537 may be a cathode-ray tube (CRT) based video display well known in the art of computer hardware. But, in other embodiments the output device 537 may be replaced with a liquid crystal display (LCD) based or gas, plasma-based, flat-panel display. In still other embodiments, any appropriate display device may be used. Although only one output device 537 is shown, in other embodiments, any number of output devices of different types or of the same type may be present. The output device 537 displays the windows 100 and 200 previously described above with reference to FIGS. 1 and 2, respectively.

The input device 538 may be a keyboard, mouse or other pointing device, trackball, touchpad, touchscreen, keypad, microphone, voice recognition device, or any other appropriate mechanism for the user to input data to the computer 510 and manipulate the user interfaces previously described above with respect to FIGS. 1 and 2. Although only one input device 538 is shown, in another embodiment any number and type of input devices may be present.

The bus 580 may represent one or more busses, e.g., PCI, ISA (Industry Standard Architecture), X-Bus, EISA (Extended Industry Standard Architecture), USB, FireWire (IEEE standard 1394), or any other appropriate bus and/or bridge (also called a bus controller).

The computer 510 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 510. The hardware and software depicted in FIG. 5 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 591 may be any suitable network and may support any appropriate protocol suitable for communication to the computer 510. In an embodiment, the network 591 may support wireless communications. In another embodiment, the network 591 may support hard-wired communications, such as a telephone line or cable. In another embodiment, the network 591 may support the Ethernet IEEE (Institute of Electrical and Electronics Engineers) 802.3x specification. In another embodiment, the network 591 may be the Internet and may support IP (Internet Protocol). In another embodiment, the network 591 may be a local area network (LAN) or a wide area network (WAN). In another embodiment, the network 591 may be a hotspot service provider network. In another embodiment, the network 591 may be an intranet. In another embodiment, the network 591 may be a GPRS (General Packet Radio Service) network. In another embodiment, the network 591 may be any appropriate cellular data network or cell-based radio network technology. In another embodiment, the network 591 may be an IEEE 802.11 wireless network. In still another embodiment, the network 591 may be any suitable network or combination of networks. Although one network 591 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A storage medium, encoded with instructions, wherein the instructions, when executed by a machine, result in the machine performing operations comprising:

representing a plurality of data items as a plurality of respective nodes in at least one tree;

displaying the at least one tree with an access time of the plurality of data items on an axis; and compressing the plurality of nodes, wherein compressing the plurality of nodes is based on a number of delimiters in addresses associated with the plurality of data items.

2. The storage medium of claim 1, further comprising:

displaying a first connector between a parent node and a first child in a first format, the parent node and the first child both being on the at least one tree; and displaying a second connector between the parent node and a second child in a second format, the parent node and the second child both being on the at least one tree, the second format being different than the first format.

3. The storage medium of claim 1, wherein the addresses associated with the plurality of data items include Uniform Resource Locator addresses.

4. The storage medium of claim 1, further comprising: expanding the plurality of nodes.

5. The storage medium of claim 1, wherein displaying the at least one tree further comprises:

displaying a connector between a parent node and a child node.

6. The storage medium of claim 5, wherein displaying the connector further comprises:

displaying the connector in a first format when the child node's respective data item was displayed in a same window as the parent node; and displaying the connector line in a second format when the child node's respective data item was displayed in a different window from the parent node.

7. In a graphical user interface, a method for displaying a history of data items navigated, the method comprising:

maintaining data representing a history of data items navigated;

displaying the data graphically as a navigation path positioned relative to a timeline, the navigation path arranged as a tree; and compressing the data items, wherein compressing the data items is based on a number of delimiters in addresses associated with the data items.

8. The method of claim 7 wherein a point in the navigation path along the timeline indicates when a data item was accessed.

9. The method of claim 7 wherein the navigation path is organized based on a parent/child relationship in a navigation sequence.

10. The method of claim 9 wherein a child node represents data items selected from data items associated with a parent of the child node.

11. The method of claim 7 wherein the data item is a web page.

12. An article comprising a storage medium having associated instructions, wherein the instructions, when performed by a machine, result in the machine performing operations comprising:

generating a plurality of nodes in a tree along a timeline, wherein each node represents a data item and each node is located along the timeline according to a time the respective data item of the node is accessed; and compressing the data items, wherein compressing the data items is based on a number of delimiters in addresses associated with data items.

13. The article of claim 12 wherein the storage medium further comprises data that when accessed results in the machine generating more than one tree, where each tree represents a data access session.

14. The article of claim 13, wherein a data access session includes a period that a web browser is used to access one or more web pages.

15. The article of claim 14, wherein a data item is a web page.

16. An apparatus comprising:
a graphical display and a user interface to display activity data in a web browser, the apparatus comprising:
a controller operable to display at least one display element on a display including displaying:
one or more nodes each representing a web page, the one or more nodes being compressible based on a number of delimiters in addresses associated with the one or more nodes;
one or more trees containing the one or more nodes; and
a timeline, wherein the nodes are positioned in relation to a time on the timeline that a data item of a node is accessed.

17. The apparatus of claim 16, wherein the controller is operable to display a line connecting two nodes of the one or more nodes, wherein the line is of a style which indicates where a node was accessed.

* * * * *